United States Patent [19]

Gaul, Jr. et al.

[11] 4,281,086

[45] Jul. 28, 1981

[54] POLYMER BOUND MULTIDENTATE COMPLEXES

[75] Inventors: John H. Gaul, Jr., Midland, Mich.; Russell S. Drago, Champaign, Ill.

[73] Assignee: The University of Illinois Foundation, Urbana, Ill.

[21] Appl. No.: 148,065

[22] Filed: May 12, 1980

Related U.S. Application Data

[62] Division of Ser. No. 968,123, Dec. 11, 1978, Pat. No. 4,230,828.

[51] Int. Cl.³ .......................... C08F 8/18; C08F 8/26; C08F 8/30; C08F 8/32
[52] U.S. Cl. ...................................... 525/330; 521/32; 525/331; 525/332; 525/334; 525/336; 525/337; 525/340; 525/374; 525/379; 525/381; 525/382
[58] Field of Search ............... 525/330, 331, 332, 334, 525/336, 337, 340, 374, 379, 381, 382; 521/32

[56] References Cited

U.S. PATENT DOCUMENTS

| | | | |
|---|---|---|---|
| 3,313,779 | 4/1967 | White | 525/384 |
| 3,337,479 | 8/1967 | Small | 521/32 |
| 3,337,480 | 8/1967 | Small | 525/377 |
| 3,843,566 | 10/1974 | Barrett | 521/32 |
| 4,093,567 | 6/1978 | Hurwitz et al. | 525/330 |
| 4,107,099 | 8/1978 | Hedge | 521/32 |
| 4,230,828 | 10/1980 | Gaul et al. | 525/332 |

*Primary Examiner*—William F. Hamrock

[57] ABSTRACT

Polymer bound multidentate complexes are prepared by reacting pendant benzyl chloride and benzyl iodide groups on a variety of polymer supports, including crosslinked polystyrene, with 3,3'-iminodiproprionitrile and reducing the nitrile groups by treatment with, for example, a boron hydride-tetrahydrofuran complex to form the amine. The amine is a precursor for other ligand systems; for example, the primary amine groups formed condense with an aldehyde or ketone to yield five coordinate Schiff base ligands. The polydentate amine ligand systems are useful for synthesis of chelating agents for sequestering metal ions from solution for purification or concentration purposes. Metal complexes of these ligands with manganese, iron, cobalt, nickel, copper, and zinc can be prepared which are useful as heterogeneous oxidation catalysts.

2 Claims, No Drawings

POLYMER BOUND MULTIDENTATE COMPLEXES

The Government has rights in this invention pursuant to Grant No. CHE-75-19171 and IPA No. 0014 awarded by the National Science Foundation.

This application is a divisional of our prior U.S. application Ser. No. 968,123 filed Dec. 11, 1978, now U.S. Pat. No. 230,828.

This invention relates to polymer bound multidentate complexe and to processes for preparing them. More particularly, this invention relates to crosslinked polystyrene containing multidentate polyamines which can be condensed with a variety of aldehydes and ketones to yield Schiff base ligand systems. These systems are capable of coordinating with bivalent metal ions. The metal complexes so formed are useful as heterogeneous oxidation catalysts.

Polymers containing chelating groups of various sizes and donor sets are well known in the art. Polymers with all nitrogen donors, all oxygen donors, sulfur, phosphorus, and arsenic donors are available. Many types of polymer structures and methods of ligand incorporation with varying degrees of success have been reported. A review of these efforts is found in Blasius, E. et al., Chelates in Analytical Chemistry, 1, 49(1967) and Tsuchida E. et al., Advances in Polymer Science, 24, 1(1977).

In general most of the above-cited polymer bound chelates contain monodentate or bidentate ligands. Monodentate ligands have the disability that metal complexes prepared with them provide unsatisfactory heterogeneous systems owing to the ease with which the metal complex can be leached from the polymer. Furthermore, since many metal ions prefer forming four and six coordinate complexes, such polymer complexes must provide the metal ion with two or three chelating groups. This would account for the wide use of either non-crosslinked or lightly crosslinked polymers in these systems. For a bidentate system, therefore, it is possible to have as many as three different species on the polymer: ML, ML$_2$, or ML$_3$ where M is the metal and L is the bidentate ligand. This can lead to severe problems in deciphering experimental data from catalytic reactions and separation methods. In these cases there is always a question as to the structure of the polymer complexes because the structure is usually inferred from the nature of the Chelate and possible solution complexes.

It is an object of this invention to provide polymer complexes containing multidentate ligands that are covalently bound to the polymer. A further object is to prepare polymer bound complexes of known geometry capable of forming metal chelates of the type ML where L represents the multidentate ligand. It is still another object of this invention to provide polymer bound chelates wherein the polymer is stable and essentially insoluble, and the chelate structure is versatile and capable of incorporating a variety of metals. These and other objects are achieved by preparing a polymer bound complex containing multidentate Schiff base ligands by the steps of condensing $HN(CH_2CH_2CN)_2$, $HP(CH_2CH_2CN)_2$ or $K^+HC(CN)_2{}^-$ with at least one of the pendant benzyl chloride or benzyl iodide groups of an insoluble polymer; converting the nitrile groups to primary amino groups by reduction with a $BH_3 \cdot THF$ complex to form the covalently attached amine complex. The amino groups can be condensed with an aldehyde or ketone to form the desired Schiff base ligand.

Suitable insoluble polymers are, for example, hydrocarbon polymers such as polyethylene and polypropylene containing pendant benzyl chloride and/or iodide functions. Particularly suitable are crosslinked polystyrene containing pendant benzylchloride and/or iodide functions. Such polymers can be readily prepared by methods known in the art, for example by copolymerizing styrene, vinyl benzene, and vinyl benzyl chloride as follows:

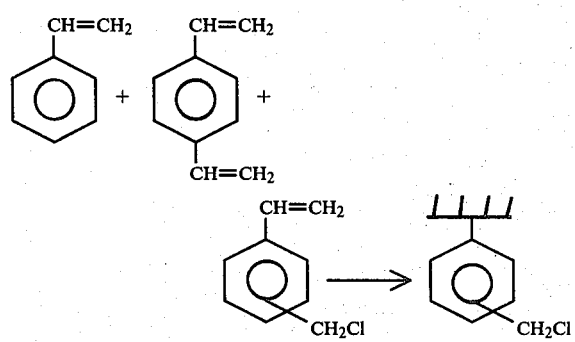

where the symbol represents crosslinked polystyrene. The vinyl benzyl chloride monomer typically contains a 60:40 mixture of meta and para isomers, which configuration is retained in the polymeric product.

Another satisfactory process includes the chloromethylation of crosslinked polystyrene according to the following scheme:

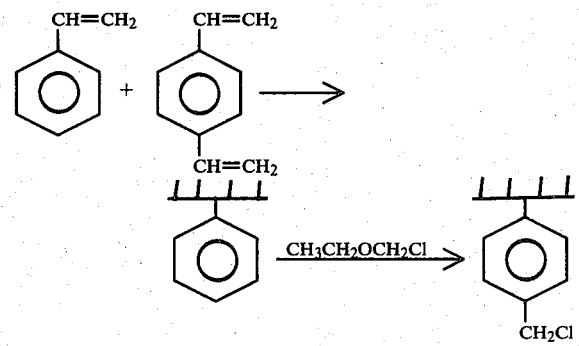

The benzyl iodide analog is prepared by refluxing the benzyl chloride containing polymer with a solution of sodium iodide for a time sufficient to replace essentially all of the chlorine atoms with iodine.

Condensation of the above polymers with 3,3'-iminoproprionitrile is effected by refluxing a slurry, for example in dioxane, of the two reactants in an inert atmosphere, for example, under argon.

Reduction of the nitrile groups of the condensation product is effected by slurrying the product in a $BH_3 \cdot THF$ solution in an inert atmosphere, for example, under argon.

The polymer bound multidentate polyamine so produced in condensed with an aldehyde or ketone to produce the Schiff base ligand by slurrying the polymer polyamine in benzene with an excess of aldehyde or ketone. Particularly suitable aldehydes are salicylaldehyde and 2-pyridine aldehyde; particularly suitable ketones are acetylacetone and 2,3-butanedione.

Metal ions such as Fe(II), Co(II), Mn(II), Ni(II), Cu(II), and Zn(II) are incorporated with the polymer bound Schiff base ligands by slurrying a non-aqueous solution of the metal salt, for example the metal acetate dissolved in dry dimethylformamide (DMF), with the polymer.

The above-described preparations can be represented by the following equations:

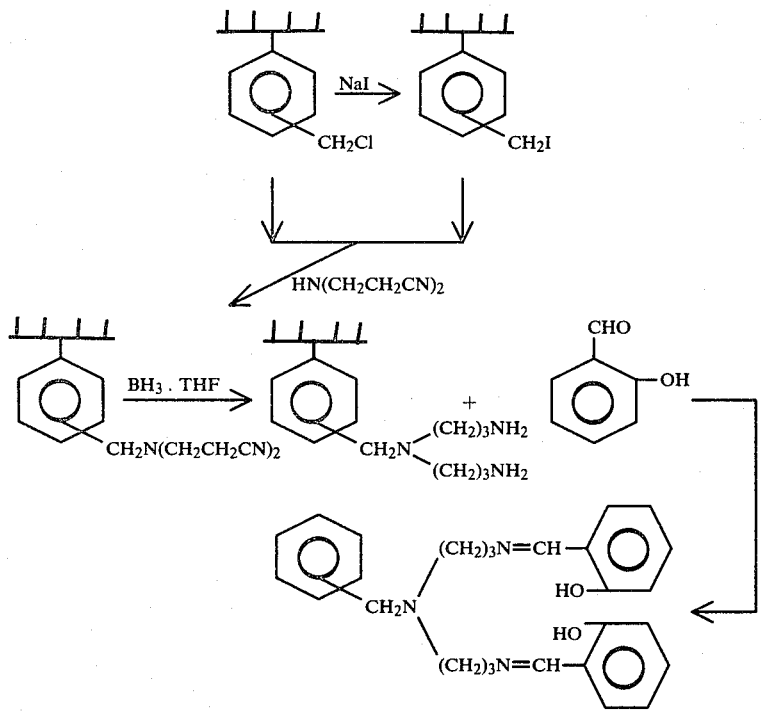

Nitrile containing polymers can also be prepared by copolymerizing styrene and benzylidenemalonitrile, $C_6H_5CH=C(CN)_2$. Reduction produces the diamine:

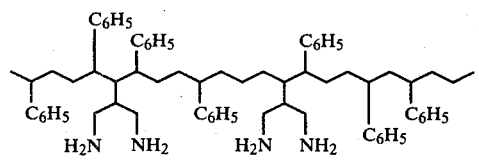

The diamine can be converted to a tetraamine as follows:

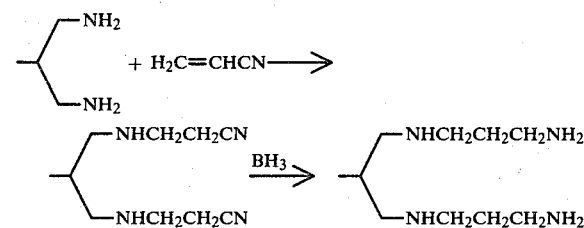

PREFERRED EMBODIMENTS OF THE INVENTION

The invention can be more readily understood and illustrated by reference to the following procedures and working examples.

EXAMPLE 1

Preparation of crosslinked co-(styrene-vinylbenzyl chloride)polymer

Styrene 123 g (1.18 moles), vinylbenzyl chloride 14 g (0.090 moles), divinyl benzene 30 g (0.225 moles), benzoyl peroxide 0.75 g, and 1.0 ml of mineral oil were added to 45 ml of warm water (80° C.) containing 4.5 g of soluble starch and stirred at 400 rpm at 80° C. for 24 hours. The reaction mixture was cooled and the white spherical polymer was screened through a fine mesh sieve (100) and washed with organic solvents and water, and then dried overnight at 80° C. The polymer contained about 1.88% of chlorine.

EXAMPLE 2

Chloromethylation of crosslinked polystyrene

A slurry was prepared of 45 g of crosslinked polystyrene in 100 g of chloromethylethyl ether in a dry atmosphere. To this slurry with cooling was added 5 ml of $SnCl_4$ in 33 g of chloromethylethyl ether. Stirring in the ice bath continued for 10 minutes, then at room temperature for 50 minutes. Aqueous dioxane (1:3 v/v) 150 ml was then added and stirring was continued for 1 hour. The polymer was filtered and washed with large quantities of water, 2N HCl, water, aqueous dioxane, dioxane, dioxane-methanol, and finally methanol, then dried at 80° C.

EXAMPLE 3

Preparation of polymer bound 3,3'-iminoproprionitrile

A slurry of 10 g of a chloromethylated polymer from Example 1 or 2 and 30 g of 3,3'-iminoproprionitrile in 75 ml of dioxane was prepared and refluxed under an argon atmosphere for three days. The polymer was then washed with copious amounts of dioxane, dioxane-water, water-tetrahydrofuran (THF), and finally extracted with THF for 24 hours. The polymer was then washed with ethanol and dried at 80° C.

Better results were obtained by converting the pendant benzyl chloride group to the benzyl iodide group and condensing with 3,3'-iminoproprionitrile as follows. An acetone-dioxane mixture (3:1 v/v) containing 25 g of chloromethylated polymer and 15-20 g of sodium iodide was refluxed for 2-4 days. The polymer was cooled, filtered and extracted with acetone for 24 hours, and then dried at 80° C. To the dried polymer was added enough THF to make an adequate slurry and 10 g of 3,3'-iminoproprionitrile. The slurry was heated at reflux for 4 days, cooled, and extracted with THF until the filtrate was colorless.

EXAMPLE 4

Preparation of polymer bound bis-(3-aminopropyl)-amine

About 20 g of the polymer of Example 3 was slurried in 150 ml of $BH_3 \cdot THF$ solution (about 1 molar) under an argon atmosphere and stirred for 1-2 days followed by refluxing for 24 hours, and then cooled. The excess $BH_3$ was destroyed by cautious addition of methanol following which the slurry was refluxed for several hours. The polymer was filtered and slurried in a 50/50 mixture of 3 M HCl/dioxane and heated for 24 hours. The slurry was then cooled, filtered and the polymer was re-slurried with dioxane-water for several hours and then washed with water. The washed polymer was again slurried with either 1.0 M NaOH/dioxane (50/50) or a concentrated dioxane solution of pyridine, 2,6-lutidine or triethylamine and stirred for 24 hours. The polymer was then filtered, washed with dioxane and dried to yield the polymer bound bis-(3-aminopropyl)-amine.

EXAMPLE 5

Preparation of polymer bound bis-(2-cyanoethyl)-phosphine and polymer bound di-(3-aminopropyl)-phosphine Bis-(2-cyanoethyl)phosphine was incorporated into chloro and iodobenzyl crosslinked polystyrene and converted to the analagous amine compound according to the procedures of Examples 3 and 4.

EXAMPLE 6

Condensations of aldehydes and ketones with polymer bound polyamines to prepare the Schiff bases To a slurry in benzene of the polymer bound polyamine prepared in Example 4 or 5 was added an excess of aldehyde or ketone. The slurry was heated to reflux and the water of condensation was removed in a Dean-Stark trap. The polymer containing Schiff base ligands was cooled, extracted with ethanol overnight, and dried at 80° C.

EXAMPLE 7

Incorporation of metal ions into polymer bound Schiff base ligands

The acetate of Mn, Co, Ni, Cu, or Zn was dissolved in dry DMF and to this was added the polymer bound Schiff base ligand. After 1-3 days the polmer was filtered and washed with DMF, then extracted with acetonitrile and dried. For Co and Mn the reaction was carried out under argon.

Incorporation of Fe(III) with the salicylaldehyde Schiff base prepared according to Example 6 was accomplished by slurrying 5 g of the base with excess $FeCl_3$ dissolved in 50 ml of a dry 1:1 (v/v) pyridine-DMF mixture. After about 1 hour the polymer was filtered and washed with pyridine/DMF until the filtrate was colorless, and the extracted with ethanol. The very dark brown beads obtained were then filtered and dried.

EXAMPLE 8

Oxidation of 2,6-dimethyl phenol

A benzene solution of 2,6-dimethyl phenol was oxidized at atmospheric oxygen pressure and room temperature in the presence of a cobalt complex prepared according to Example 7. The molar ratio of 2,6-dimethyl phenol to cobalt complex was 1:0.05. The oxidation was also carried out at an oxygen pressure of 60 psi. In both experiments the products were the corresponding benzoquinone and diphenoquinone as determined by dry column chromatography and thin layer chromatography.

The polyamine ligand systems and the Schiff base ligand systems produced as described above are useful chelating agents for sequestering metal ions, for example for the purpose of purifying drinking water. Undesirable metals can also be removed from industrial effluent streams to meet environmental discharge standards.

The Schiff base ligand systems form high spin five-coordinated complexes with Mn(II), Co(II), Ni(II), Cu(II), Fe(II), and Zn(II). Such complexes are effective heterogeneous catalysts, for example, for the oxidation of disubstituted phenols to the corresponding benzoquinone and diphenoquinone derivatives.

Although this invention has been described in detail with particular reference to certain preferred embodiments thereof, it is understood that variations and modifications can be effected within the scope of the appended claims. It is intended that all matter contained in the above description and equations shall be interpreted in an illustrative and not in a limiting sense.

What is claimed is:

1. A polymer bound multidentate ligand system comprising an insoluble crosslinked polymer support and at least one pendant polyamine ligand attached thereto, the ligand being represented by the formula

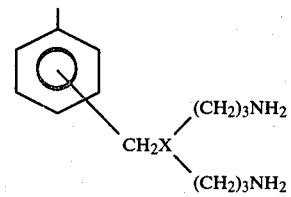

where X is nitrogen or phosphorus.

2. The polymer bound multidentate ligand system of claim 1 wherein X is nitrogen and the polymer support is crosslinked polystyrene.

* * * * *

UNITED STATES PATENT AND TRADEMARK OFFICE
CERTIFICATE OF CORRECTION

PATENT NO. : 4,281,086  Page 1 of 2

DATED : July 28, 1981

INVENTOR(S) : John H. Gaul, Jr., and Russell S. Drago

It is certified that error appears in the above—identified patent and that said Letters Patent is hereby corrected as shown below:

Column 1, line 10, "Pat. No. 230,828" should read -- Pat No. 4,230,828 --.

Column 2, line 28, "symbol         " should read -- symbol / / / / --.

Column 2, lines 44 to 50, that portion of the reaction equation reading "$CH_3CH_2OCH_2Cl \longrightarrow$" should read -- $\underset{SnCl_4}{CH_3CH_2OCH_2Cl \longrightarrow}$ --.

UNITED STATES PATENT AND TRADEMARK OFFICE
CERTIFICATE OF CORRECTION

PATENT NO. : 4,281,086

DATED : July 28, 1981

INVENTOR(S) : John H. Gaul, Jr., and Russell S. Drago

It is certified that error appears in the above—identified patent and that said Letters Patent is hereby corrected as shown below:

In the reaction equation extending across columns 3 and 4, the bottom formula should read --

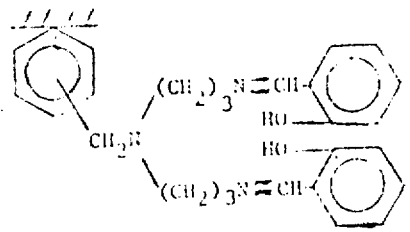

Signed and Sealed this

Nineteenth Day of April 1983

[SEAL]

Attest:

GERALD J. MOSSINGHOFF

Attesting Officer

Commissioner of Patents and Trademarks